(12) United States Patent
Soga et al.

(10) Patent No.: US 10,677,616 B2
(45) Date of Patent: Jun. 9, 2020

(54) DISTRIBUTED DYNAMIC STRAIN FIBER OPTICS MEASUREMENT BY BRILLOUIN OPTICAL TIME-DOMAIN REFLECTOMETRY

(71) Applicant: THE REGENTS OF THE UNIVERSITY OF CALIFORNIA, Oakland, CA (US)

(72) Inventors: Kenichi Soga, Berkeley, CA (US); Bo Li, Harbin (CN); Jize Yan, Cambridge (GB); Linqing Luo, Hefei (CN); Yifei Yu, Dalian (CN)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 16/227,119

(22) Filed: Dec. 20, 2018

(65) Prior Publication Data
US 2019/0195665 A1 Jun. 27, 2019

Related U.S. Application Data

(63) Continuation of application No. PCT/US2017/039563, filed on Jun. 27, 2017.
(Continued)

(51) Int. Cl.
*G01D 5/353* (2006.01)
*G01K 11/32* (2006.01)
(Continued)

(52) U.S. Cl.
CPC ..... *G01D 5/35364* (2013.01); *G01D 5/35348* (2013.01); *G01K 11/32* (2013.01);
(Continued)

(58) Field of Classification Search
CPC ............... G01D 5/353; G01D 5/35364; G01D 5/35348; G01K 11/32; G01K 2011/322
See application file for complete search history.

(56) References Cited

U.S. PATENT DOCUMENTS 5,767,956 A * 6/1998 Yoshida ............. G01M 11/3109
356/73.1
9,197,032 B2 11/2015 Qiu
(Continued)

FOREIGN PATENT DOCUMENTS

WO 2010011211 A1 1/2010
WO 2018005539 A1 1/2018

OTHER PUBLICATIONS

ISA/KR, Korean Intellectual Property Office (KIPO), International Search Report and Written Opinion dated Sep. 21, 2017, related PCT international application No. PCT/US2017/039563, pp. 1-19, claims searched, pp. 20-24.

*Primary Examiner* — Jonathan M Hansen
(74) *Attorney, Agent, or Firm* — O'Banion & Ritchey LLP; John P. O'Banion

(57) ABSTRACT

A system and method for distributed dynamic strain measurement using optical fiber that is based on Brillouin optical time-domain reflectometry (BOTDR) with stimulated Brillouin scattering (SBS). A short-time Fourier transform (STFT) is used to rebuild the Brillouin frequency shift (BFS) of the SBS scattered signal to perform the dynamic strain measurement.

26 Claims, 9 Drawing Sheets

Related U.S. Application Data

(60) Provisional application No. 62/355,304, filed on Jun. 27, 2016.

(51) Int. Cl.
    *G01L 1/24*         (2006.01)
    *G01M 11/00*      (2006.01)

(52) U.S. Cl.
    CPC ......... *G01L 1/242* (2013.01); *G01M 11/3118* (2013.01); *G01K 2011/322* (2013.01)

(56) References Cited

U.S. PATENT DOCUMENTS

| | | | |
|---|---|---|---|
| 2011/0090936 A1* | 4/2011 | Kupershmidt | G01D 5/35364 374/142 |
| 2013/0025374 A1 | 1/2013 | Voskoboinik | |
| 2014/0218717 A1 | 8/2014 | Zhang | |
| 2014/0306101 A1* | 10/2014 | Zornoza Indart | G01D 5/35364 250/227.14 |
| 2016/0025524 A1 | 1/2016 | Nikles | |

* cited by examiner

DISTRIBUTED DYNAMIC STRAIN FIBER OPTICS MEASUREMENT BY BRILLOUIN OPTICAL TIME-DOMAIN REFLECTOMETRY

CROSS-REFERENCE TO RELATED APPLICATIONS

This application claims priority to, and is a 35 U.S.C. § 111(a) continuation of, PCT international application number PCT/US2017/039563 filed on Jun. 27, 2017, incorporated herein by reference in its entirety, which claims priority to, and the benefit of, U.S. provisional patent application Ser. No. 62/355,304 filed on Jun. 27, 2016, incorporated herein by reference in its entirety. Priority is claimed to each of the foregoing applications.

The above-referenced PCT international application was published as PCT International Publication No. WO 2018/005539 A1 on Jan. 4, 2018, which publication is incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to structural health monitoring, and more particularly to distributed dynamic strain measurement using Brillouin optical time-domain reflectometry (BOTDR) with stimulated Brillouin scattering (SBS).

2. Background Discussion

In recent years, structural health monitoring (SHM) is becoming critical in structural engineering and geotechnical engineering applications. Distributed fiber optic sensors technology, as an effective method of SHM, has the advantages of long sensing distance, distributed sensing information and small sensor size. Rayleigh and Brillouin based distributed fiber optic sensors therefore have been developed to monitor distributed temperature and strain information for decades. With the development of smart infrastructure, distributed dynamic measurement of strain can be used in many applications, such as detection of seismic activity, perimeter security and intrusion sensing, traffic monitoring, railway monitoring and bridge monitoring.

Phase-sensitive optical time domain reflectometry (phase-OTDR), the most studied Rayleigh based dynamic system, has been proved to be capable of detecting strain vibration as accurate as $0.08\mu\varepsilon$, but it can only give the relative strain between two strain conditions. In addition, phase-OTDR has a limited strain range of as low as $2\mu\varepsilon$, and its linearity between phase and strain is sensitive to the intrinsic phase of the fiber.

Brillouin based dynamic systems can measure the absolute strain with a large strain range higher than ten thousand $\mu\varepsilon$. Brillouin based systems demonstrate a slow sampling rate (tens of Hz to a few hundred Hz) and a limited sensing distance from tens of meters to a few hundred meters.

Brillouin optical time-domain reflectometry (BOTDR) has the advantage of single-end access compared with Brillouin optical time-domain analysis (BOTDA) so that BOTDR can work even if the optic fiber cable is broken halfway. At the construction site, this advantage brings huge benefits for sensor deployment and testing. However, BOTDR usually needs a large number of averaging due to the weak power of spontaneous Brillouin scattering (SpBS) and the conventional frequency scanning method. Recently, Short-time Fourier transform (STFT) algorithm takes the place of frequency scanning in BOTDR, reduces the averaging times and realizes the dynamic strain measurement, whose performance is limited by the signal-to-noise ratio (SNR) that is usually low in BOTDR.

Stimulated Brillouin scattering (SBS) is usually avoided in BOTDR, which weakens the injected power along long fiber under test (FUT) (tens of km) and shortens the sensing distance. For many civil engineering applications, however, the sensing distance requirement is reduced to 1 km, e.g. the monitoring of piles and buildings, greatly shorter than the achievable sensing distance of BOTDR.

BRIEF SUMMARY

An aspect of the present disclosure is a system and method for distributed dynamic strain measurement using optical fiber that is based on Brillouin optical time-domain reflectometry (BOTDR) with stimulated Brillouin scattering (SBS). In one embodiment, short-time Fourier transform (STFT) is used for the rebuild of the Brillouin frequency shift (BFS).

In one embodiment, the output signal power and signal-to-noise ratio (SNR) of the system output is enhanced by stimulated Brillouin scattering with the same amount of average, offering offer larger sensing signal, better signal-to-noise ratio and longer sensing distance up to a few km lengths. The processing of the signal can be faster with fewer average times.

In one embodiment, the system can take strain readings at every 4 m along a 1 km length optical fiber at 2.5 kHz sampling speed with a strain resolution of 30 microstrain. Theoretical calculation shows that the system can have a strain resolution of 10 microstrain at 2.5 kHz for a 1 km length fiber or 130 microstrain at 100 Hz for a 10 km length fiber.

Potential uses may include, among others, the following: a) measurement of dynamic/static straining and temperature changes of infrastructure (bridges, tunnels, roads, etc.) and buildings; b) measurement of dynamic/static straining and temperature changes of airplanes, ships, etc.; and c) measurement of dynamic/static straining and temperature changes of oil and gas wellbores.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

Figure 1:
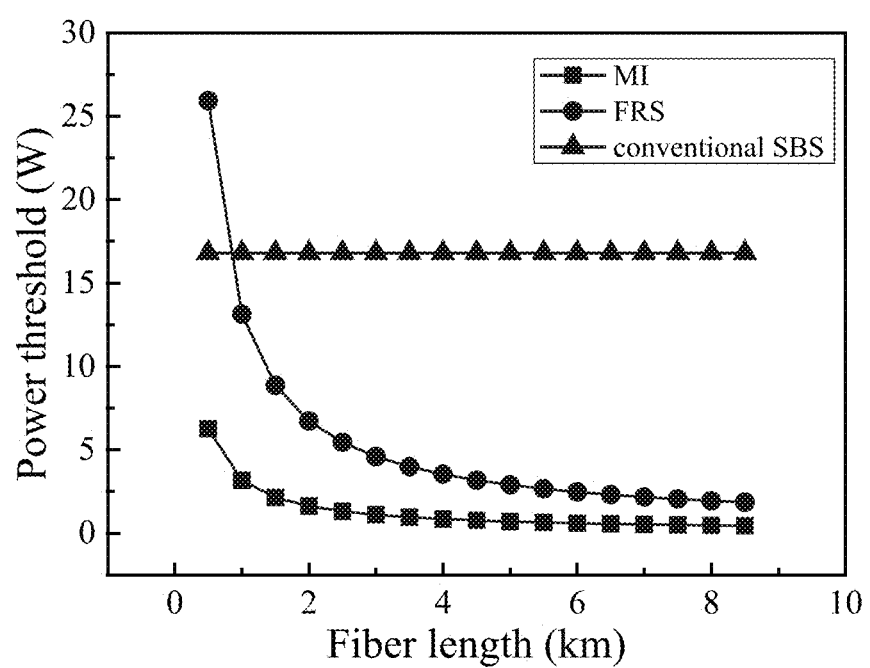
FIG. 1 is a plot showing MI thresholds, conventional SBS thresholds and FRS thresholds at different fiber lengths with 40 ns pulse duration.

The systems and methods disclosed herein incorporate small gain stimulated Brillouin scattering (SBS) in Brillouin optical time-domain reflectometry (BOTDR) to improve the power of Brillouin scattering and SNR, and therefore reduce the number of averaging, further increasing the speed of dynamic strain measurement. A small gain SBS based short-time Fourier transform (STFT)-BOTDR is described and tested for dynamic strain and vibration measurement. The input power limits, the frequency uncertainties for given pulse durations, fiber lengths and number of averaging are calculated limited by nonlinear effects.

1. Fundamental Principles

Injecting a high input pulse power can enhance the SNR. The input pulse power is limited by SBS, modulation instability (MI) and forward Raman scattering (FRS) in BOTDR.

Raman scattering has a much larger frequency shift than Brillouin scattering of about 13 THz. Once the input power reaches the threshold, the Raman scattering power increases exponentially. The FRS input threshold is:

$$P_{th-R} = \frac{16 A_{eff}}{g_R L_{eff}}, \quad \text{Eq. 1}$$

where $A_{eff}$ is the nonlinear effective area of the fiber, $g_R$ is the Raman gain coefficient, $L_{eff}$ is the fiber effective length.

Raman scattering has a much higher power threshold than MI, so the MI and the SBS effects are the main constraints for the input power in BOTDR.

MI occurs under the condition of anomalous dispersion at the given input wavelength ($\beta_2 \langle 0, D \rangle 0$). It is the modulation of the stable state of cw or quasi-cw light caused by the interaction between nonlinearity and anomalous dispersion and brings instability. This MI effect will lead to spectral sidebands symmetrically on both sides of the frequency of the input pulse which rises with the input power. At the wavelength of 1550 nm, anomalous dispersion is observed on single-mode communication optic fibers.

The MI gain is described as:

$$g_{MI}(\omega) = |\beta_2 \omega|(\omega_c^2 - \omega^2)^{1/2}, \quad \text{Eq. 2}$$

$$\omega_c^2 = \frac{4\gamma P_0}{|\beta_2|}, \quad \text{Eq. 3}$$

where $\beta_2$ is the fiber dispersion coefficient, $P_0$ is the input power, $\gamma$ is the nonlinear parameter, $\omega$ is the frequency and $\omega_c$ is the critical frequency. The MI gain exists with $|\omega|<\omega_c$.

The gain has the maximum value at the two frequencies given by:

$$\omega_{max} = \pm \frac{\omega_c}{\sqrt{2}} = \pm \left(\frac{2\gamma P_0}{|\beta_2|}\right)^{1/2}. \quad \text{Eq. 4}$$

The maximum gain is written as:

$$g_{max} = g(\omega_{max}) = 2\gamma P_0. \quad \text{Eq. 5}$$

The maximum gain increases linearly with the input power and is independent of the dispersion coefficient.

The MI threshold can be calculated by defining the effective bandwidth and finding the critical input power when the MI power is equivalent to the input power.

The equation of MI threshold of the fiber utilized in the experiment in this paper is expressed as:

$$P_{th-MI} = \frac{11}{2\gamma L_{eff}}. \quad \text{Eq. 6}$$

The back-scattered Rayleigh signal along the FUT from the spectral sidebands by MI can be situated within the frequency range of the captured data. Once this Rayleigh signal overlaps with the desired Brillouin signal and the Rayleigh power is comparable with the Brillouin power, the detected Brillouin frequency will be deteriorated and upward shifted.

The conventional SBS threshold is usually defined as the input power when the SBS power equals to it, which can be high for short fibers. The governing equation for the threshold is $$P_{th-B} = \frac{21A_{eff}}{g_B L}, \quad \text{Eq. 7}$$

where $g_B$ is the Brillouin coefficient and L is the interaction length, which equals to the spatial resolution of the BOTDR. By setting the interaction length of SBS to be 4 m for 40 ns pulse duration, conventional SBS thresholds, MI thresholds and FRS thresholds for different fiber lengths are illustrated in FIG. 1. It can be seen that the MI threshold is smaller than the conventional SBS threshold and that the FRS threshold is larger than MI threshold. In fact, by substituting the parameters with numerical values in Eq. 1 and Eq. 6 and using SI units, it can be derived that $P_{th-R}=1.28\times10^4/L_{eff}$, $P_{th-MI}=3.09\times10^3/L_{eff}$, $P_{th-B}=67.2/L$, and hence $P_{th-R}=4.14P_{th-MI}\cdot P_{th-R}$ is always larger than $P_{th-MI}$. $P_{th-MI}$ is only larger than $P_{th-B}$ when $L_{eff}/L<46$. For interaction length L of 4 m, $P_{th-B}$ becomes the dominant threshold when $L_{eff}<184$ m. However, under this condition, $P_{th-B}$16.8 W, which is a high power for normal optic fiber and thermal effects might cause damage on the fiber. This proves that MI threshold determines the maximum input power threshold for BOTDR. The small gain SBS is happening below MI threshold.

2. System Configuration

Figure 2:
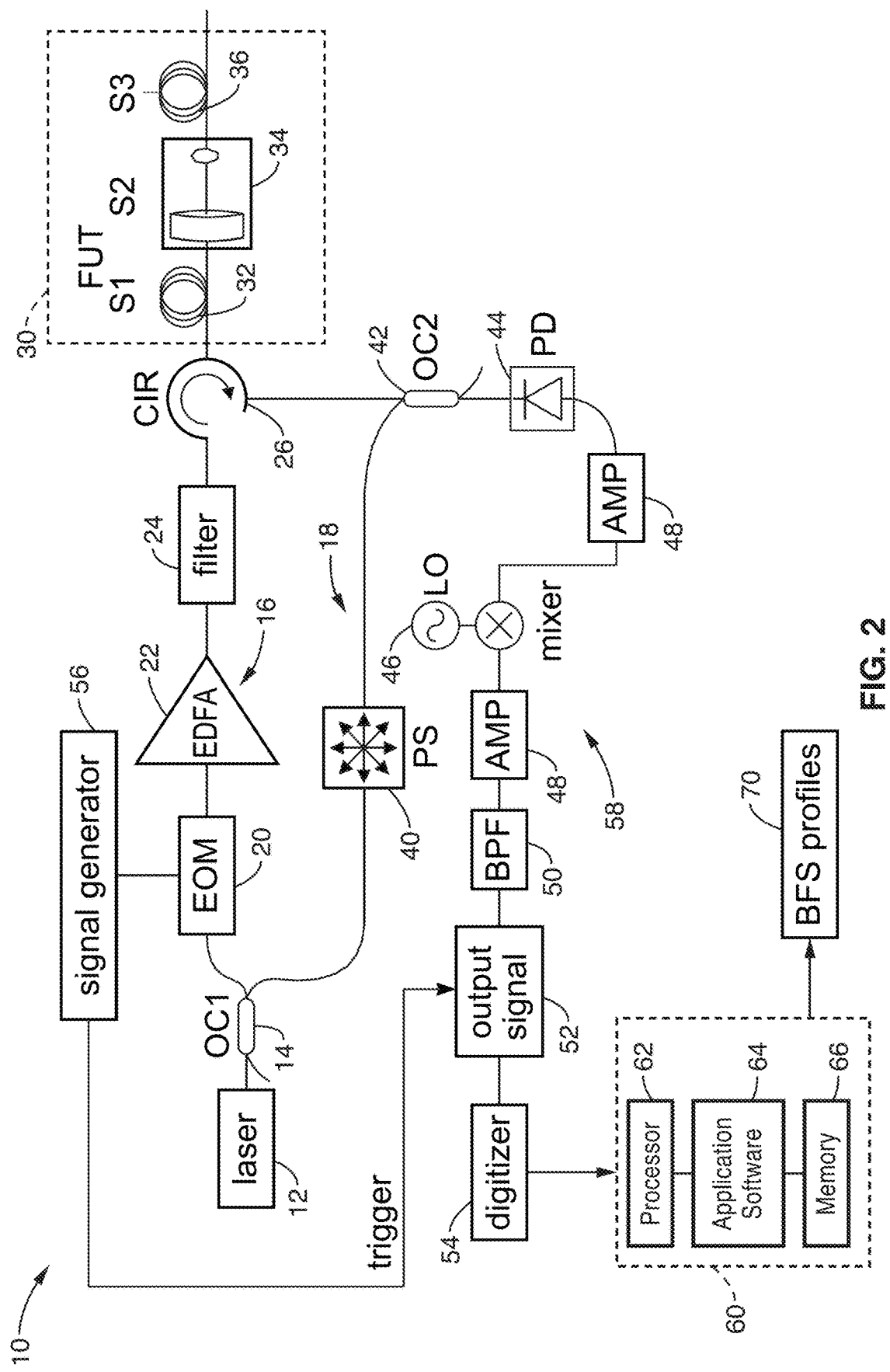
FIG. 2 shows a schematic diagram of the BOTDR system in accordance with the present description.

FIG. 2 shows a schematic diagram of a BOTDR system 10 in accordance with the present technology. The configuration of BOTDR system 10 is illustrated in FIG. 2 for purposes of a test setup with fiber under test (FUT) 30 as the subject for measurement. However, it is appreciated that the principles of the BOTDR system 10 may be used for measurement of numerous materials and structures.

A light source (e.g. narrow-line width external cavity laser 12) provides continuous-wave (CW) light at 1550 nm, followed by a 50/50 coupler (OC1) 14, which splits the light into two branches. An electro-optic modulator (EOM) 20 modulates a first branch 16 of the split light according to a signal from signal generator 56, using a 40 ns pulse at 62.5 kHz repetition rate. The modulated light is amplified by a tunable erbium-doped fiber amplifier (EDFA) 22. The output of the EDFA 22 is filtered by a band pass filter (BPF) 24 before being injected into a circulator 26. The output of the circulator 26 is injected into the fiber under test (FUT) 30 to generate the Brillouin scattered light to be analyzed.

The FUT 30 comprises a 915 m standard single mode fiber (section S1) 32, and a 15 m single mode strain fiber (section S2 34 and section S3 36). Fiber section S2 34 (about 5.6 m long) was connected to a shaker (not shown) to produce vibration on the fiber 34.

The lower branch 18 of the signal from OC1 14 comprises the optical local oscillator (OLO), or the reference light, of the coherent detection system. A 700 kHz polarization scrambler (PS) 40 was added on this branch to provide random polarization and reduce polarization fading noise. The reference light OLO 18 and the Brillouin scattered light 16 pass through a second 50/50 coupler (OC2) 42 and are mixed on a photodetector (PD) 44 of detection assembly 58. The PD output signal is downconverted by a 10.5 GHz local oscillator 46, and electronically amplified (via amplifiers 48) and filtered via band-pass filter (BPF) 50 to produce output signal 54. The output signal is then captured by a digitizer 52 at 5 GSa/s and processed on a computer 60, which included application software 64 stored in memory 66 to process the output signal 52 on processor 62 to generate BFS profiles 70. Application software 64 preferably comprises instructions for implementing a short-time Fourier transform (STFT) algorithm or method to rebuild of the Brillouin frequency shift (BFS).

Conventionally BOTDR systems use SpBS but not SBS. For a long sensing distance, SBS can cause large power depletion. For short fiber lengths (<1 km for civil engineering applications), small SBS does not generate large power depletion and loose the constraint of input pulse power threshold. Therefore, small gain SBS can be utilized in short sensing fibers to enhance the SNR, which determines the detectability and accuracy of a BOTDR system. The processing time can be reduced by SNR improvement and reduction of averaging times. The SNR calculation of the sensing system is given as:

$$SNR(dB) = 10\log_{10}\left(\frac{2R^2 P_B P_{OLO} \sqrt{N}}{4kTB/R_L + 2eRP_{OLO}B + (RP_{OLO})^2 RIN\ B}\right) - NF_{E-noise}, \quad \text{Eq. 8}$$

where R is the responsivity of the photodetector 44, $P_B$ is the Brillouin scattering power, $P_{OLO}$ is the power of the local oscillator branch 18 from the laser 12, N is the number of averaging, k is the Boltzmann constant, T is the temperature, B is the detected bandwidth, $R_L$ is the load resistance, e is the electron charge, RIN is the relative intensity noise, and $NF_{E-noise}$ is the noise figure by electronic components.

The power of the OLO branch 18 is much higher than the Brillouin scattering signal from branch 16. So the shot noise and the RIN noise (the second and the third terms of the denominator) can be seen to be related with $P_{OLO}$ only. The thermal noise (the first term of the denominator), the shot noise and the RIN noise are therefore independent of $P_B$. Furthermore, for this BOTDR system 10, a total calculated electronic noise figure (NF) of 2.11 dB is added onto the system, which is hardly influenced by the Brillouin power as well. The noise by the EDFA 22 seen on the PD 44 is much smaller than the shot noise and thermal noise and hence can be neglected. The SNR, therefore, is to be mainly influenced by the numerator. With the same setup, the increase of $P_B$ will enhance the numerator of Eq. 8 and the SNR.

c. Characterization of the System Performance

The spontaneous Brillouin scattering (SpBS) is a linear process. The Stokes signal and anti-Stokes signal are located symmetrically on both sides of the Rayleigh signal on the optical spectrum with similar power for SpBS. The SpBS power induced in optic fiber can be calculated as:

$$P_{SpBs} = T S \gamma_{SpBS} P_0, \quad \text{Eq. 9}$$

where $T_{pulse}$ is the pulse duration, S is the capture fraction, and $\gamma_{SpBS}$ is the SpBS coefficient.

As the input peak pulse power increases, SBS occurs. The SBS is a nonlinear process, whose Stokes signal power is exponentially amplified by the increased input power. The Brillouin single-pass gain of SBS is expressed as:

$$G_B = \frac{g_B P_0 L}{A_{eff}}. \quad \text{Eq. 10}$$

Considering the pulse duration adopted in BOTDR, the SBS induced Stokes power by SBS generator on optic fiber can be calculated as:

$$P_B = \begin{cases} P_N e^{G_B} & \Gamma_B T_{pulse} > G_B/2 \\ P_N e^{-2\Gamma_B T pulse + 2\sqrt{2G_B \Gamma_B T}} & \Gamma_B T_{pulse} < G_B/2 \end{cases} \quad \text{Eq. 11}$$

where $P_N$ is the noise that initiates the SBS process, $\Gamma_B$ is the phonon damping rate. $P_N$ is usually calculated as a fixed fraction of the injected light power. A typical phonon lifetime $1/\Gamma_B$ of optic fiber is 5 ns.

The Brillouin power is the main factor that influences the SNR. The detected spectral resolution $\delta v_B$ of the BOTDR is related with the SNR and the Brillouin bandwidth $\Delta v_B$ as given by:

$$\delta v_B = 0.67 \times \sqrt{\frac{\sigma \cdot \Delta v_B}{SNR}}. \quad \text{Eq. 12}$$

Accordingly, a higher SNR leads to a better spectral resolution for the system.

The Brillouin bandwidth is typically about 30 MHz (as a function of the phonon damping rate) for SpBS and small gain SBS. It becomes narrower with larger Brillouin gain.

The dynamic sampling rate of BOTDR is given by:

$$f_{samp} = \frac{1}{T_0 N}, \quad \text{Eq. 13}$$

where $T_0$ is the period of the input pulse and N is the averaging number. $T_0$ is set to be larger than the total time ($T_{period}$) needed for the pulse to travel into and back from the FUT 30 to eliminate overlap. The shortest time $T_0$ is given by:

$$T_0 = T_{period} = \frac{2L_0}{v_g}, \quad \text{Eq. 14}$$

where $L_0$ is the fiber length and $v_g$ is the group velocity of light.

Figure 3:
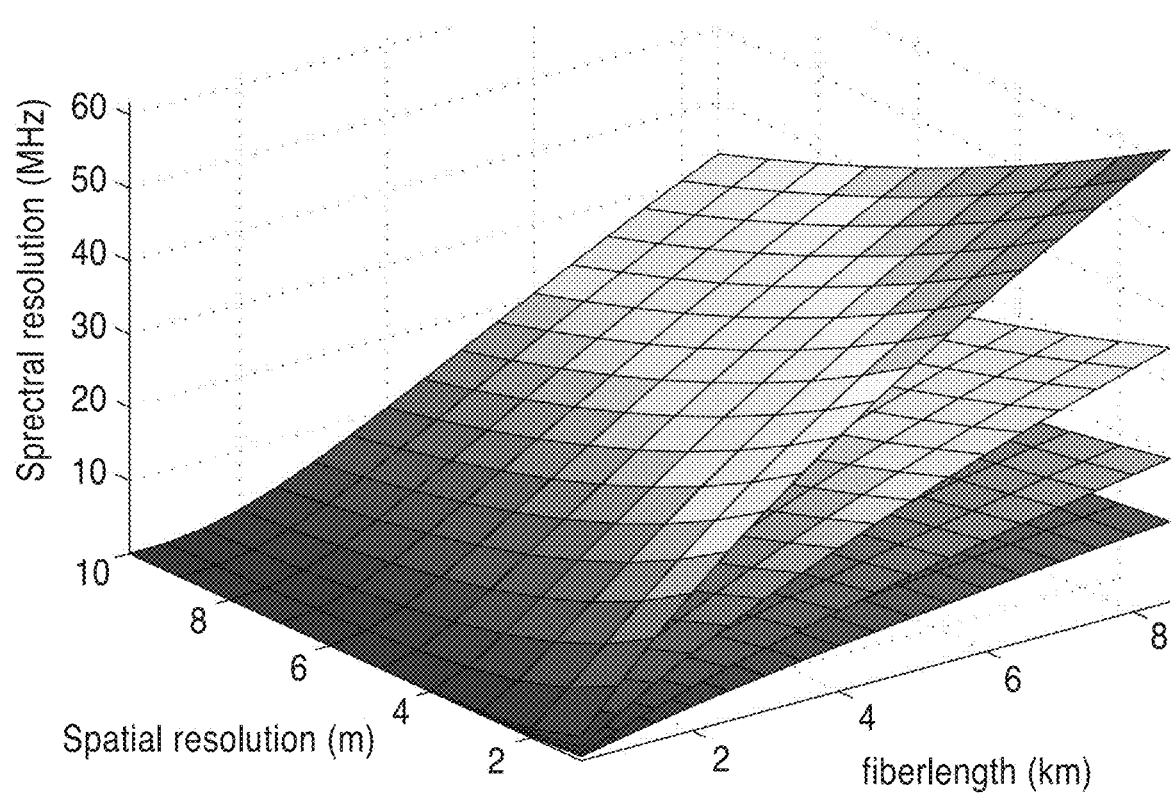
FIG. 3 is a plot illustrating calculation of BFS uncertainty at different fiber lengths, spatial resolution and sampling frequency.

Using Eq. 8 and Eq. 10 through Eq. 14, the uncertainty of Brillouin frequency shift (BFS) can be theoretically modelled. Using Eq. 6 the MI threshold, i.e. the maximum input pulse power at a given fiber length, can be calculated. Consequently, the best BFS uncertainty at a given spatial resolution, fiber length and sampling frequency can be derived, as shown in FIG. 3. It shows a good spectral resolution with the fiber length below 2 km.

4. Experimental Results

The dynamic strain measurement of the BOTDR system 10 is experimentally verified with 60 Hz vibration frequency on the shaker. The EDFA 22 output power was tuned to produce different injected peak pulse power into the FUT 30, at 1.2 W, 2.38 W and 3.12 W respectively.

The input pulse was 40 ns wide with 16 µs period (62.5 kHz repetition frequency), leading to 4 m spatial resolution. The output signal 52 was captured by a digitizer 54 for 50 ms at each measurement, and processed with the averaging number of 25 to derive each profile of BFS 70, leading to a 2.5 kHz sampling rate for vibration detection. According to Nyquist principle, a vibration of up to 1.25 kHz can be detected. By setting a faster pulse repetition frequency, the vibration sampling rate can be faster and reach up to 4 kHz for 1 km fiber under the same condition (100 kHz pulse repetition for 10 µs period). The spatial sampling resolution was set to 0.4 m by setting up the STFT, which means that there is a BFS result along the fiber at every 0.4 m.

Figure 4A:
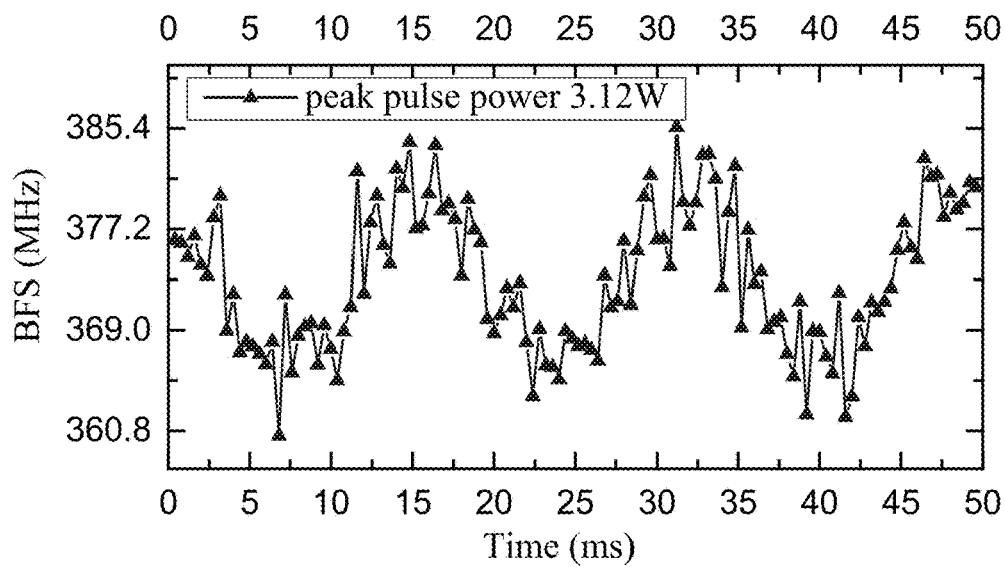
FIG. 4A, FIG. 4B and FIG. 4C are plots of measured 60 Hz strain vibration at different input peak pulse power levels.
Figure 4B:
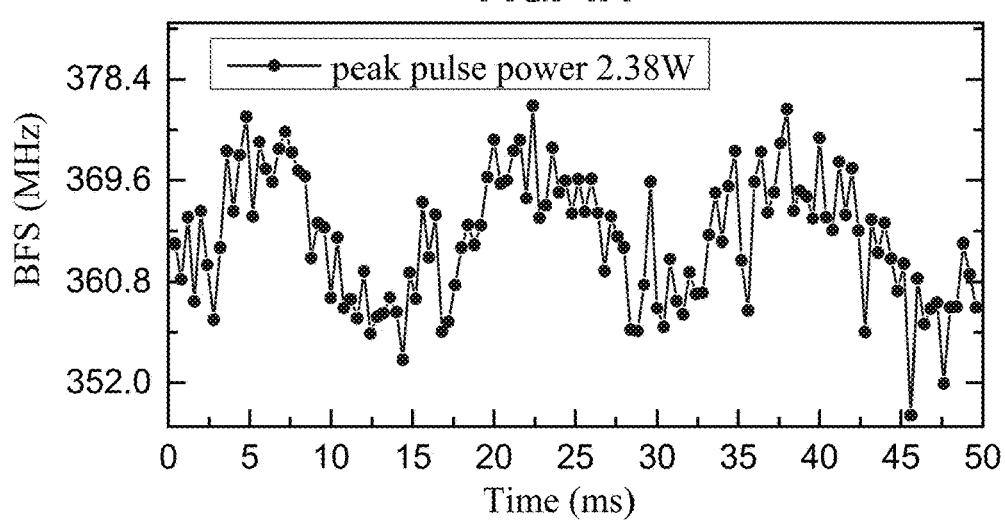
Figure 4C:
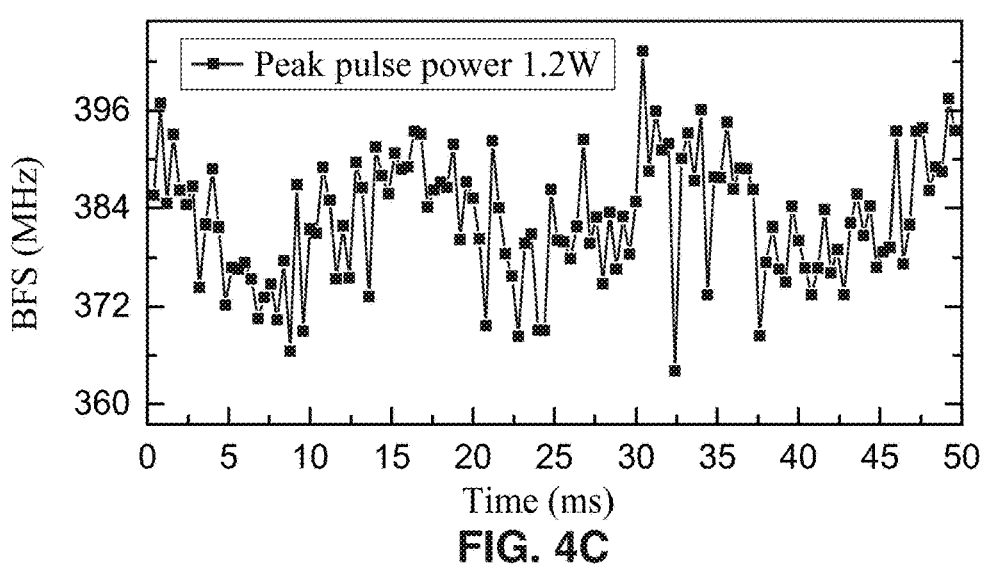

The measured strain vibration over 50 ms is shown in FIG. 4, which was obtained by averaging of the derived BFS over fiber section S2 34. At 3.12 W input peak pulse power, a clear sine waveform can be seen. The measured peak-to-peak change of BFS is about 16 MHz, corresponding to 320µε strain change on the fiber. At 1.2 W peak pulse power, the shape of the derived waveform is much more distorted. Via sine fitting, the R-squared values (the parameter describing how close the fitted results are to the data) of 0.75, 0.59 and 0.37 are derived for the peak pulse power of 3.12 W, 2.38 W and 1.2 W, respectively.

Figure 5:
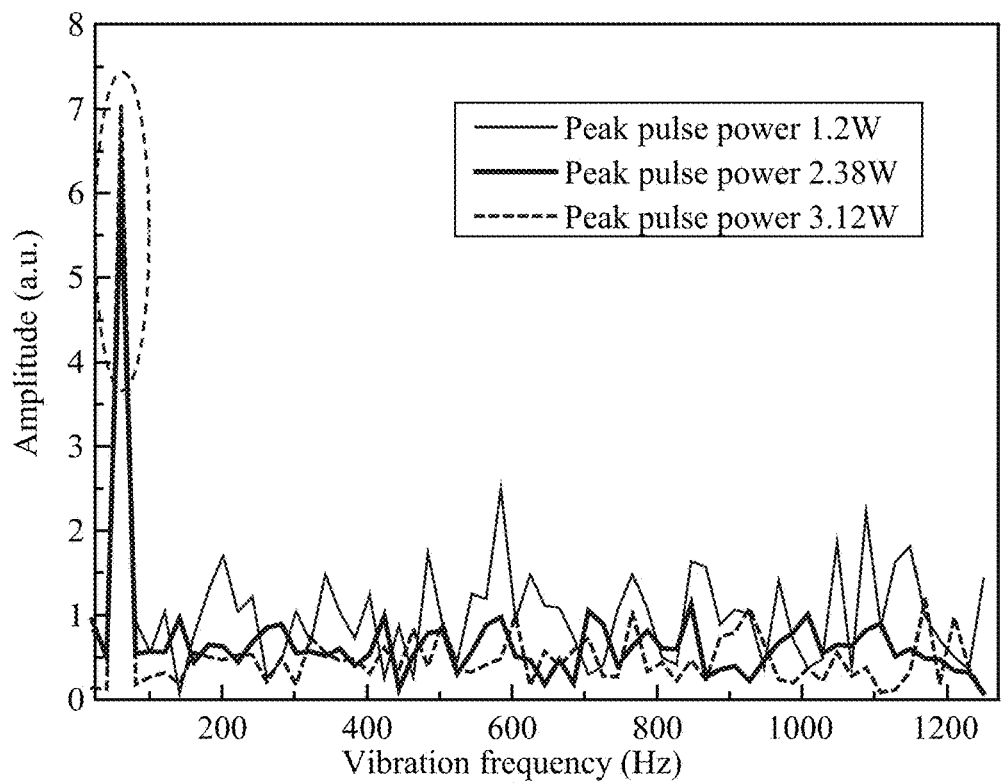
FIG. 5 is a plot of spectra of the measured strain vibration profiles by Fourier transform.

Spectra of the measured strain vibration profiles in FIG. 4 were demonstrated in FIG. 5. A frequency component at 60 Hz can be seen in FIG. 5 for each input power level. Furthermore, the noise level at 1.2 W is the highest among the three spectra while the spectra at 3.12 W gives the best noise level. The experimental result at 3.12 W with SBS effect gives a better detection of strain vibration at 2.5 kHz vibration sampling rate.

Figure 6:
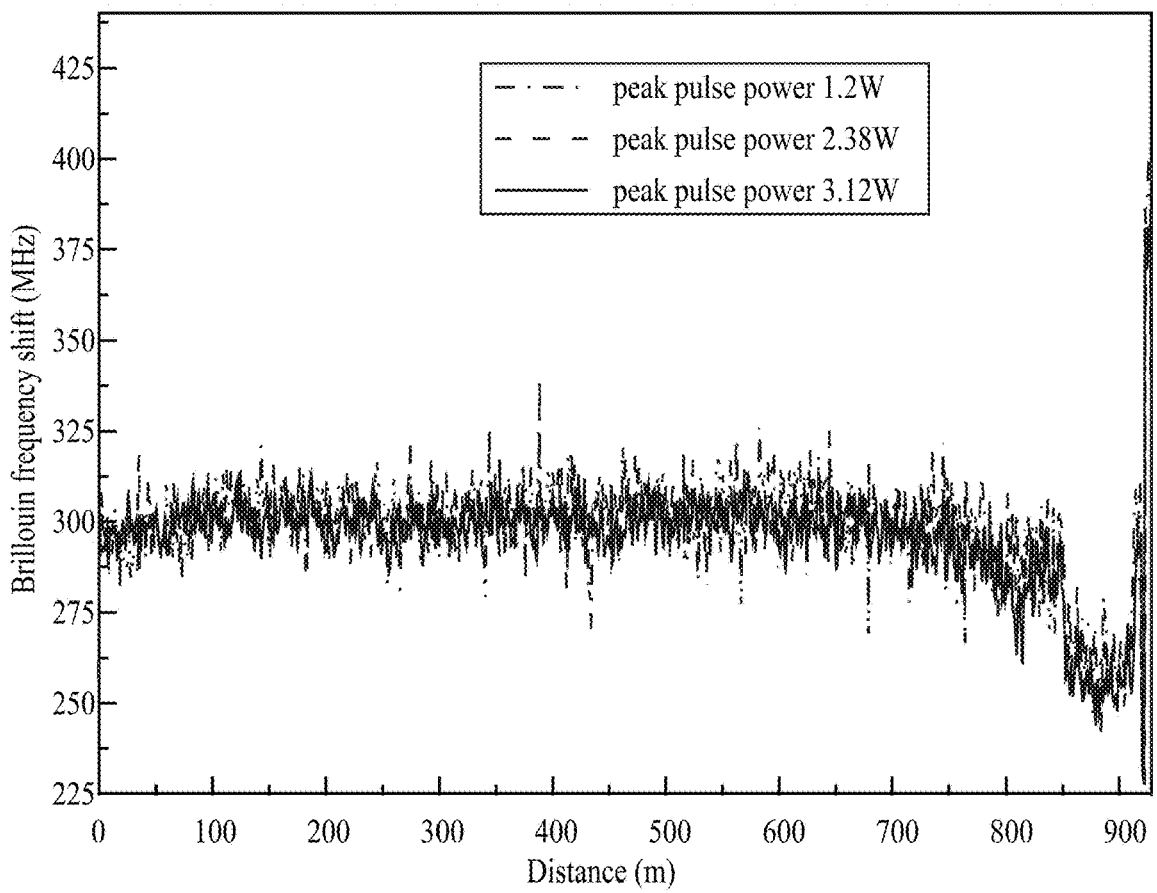
FIG. 6 is a plot of measured profiles of Brillouin frequency shift (BFS) at different input peak pulse power.

The corresponding BFS profiles 70 obtained after signal processing are illustrated in FIG. 6. From the position of 850 m to 910 m, the BFS drops for about 40 MHz due to the change of condition of the fiber. The fluctuation of the measured BFS at the peak pulse power of 1.2 W is much larger than that at 3.12 W. The corresponding frequency uncertainty for each input power level is calculated as the standard deviation of the measured BFS over time. The uncertainties are 5.1 MHz, 6.3 MHz, and 10.7 MHz at 3.12 W, 2.38 W and 1.2 W input peak pulse power, respectively.

Figure 7A:
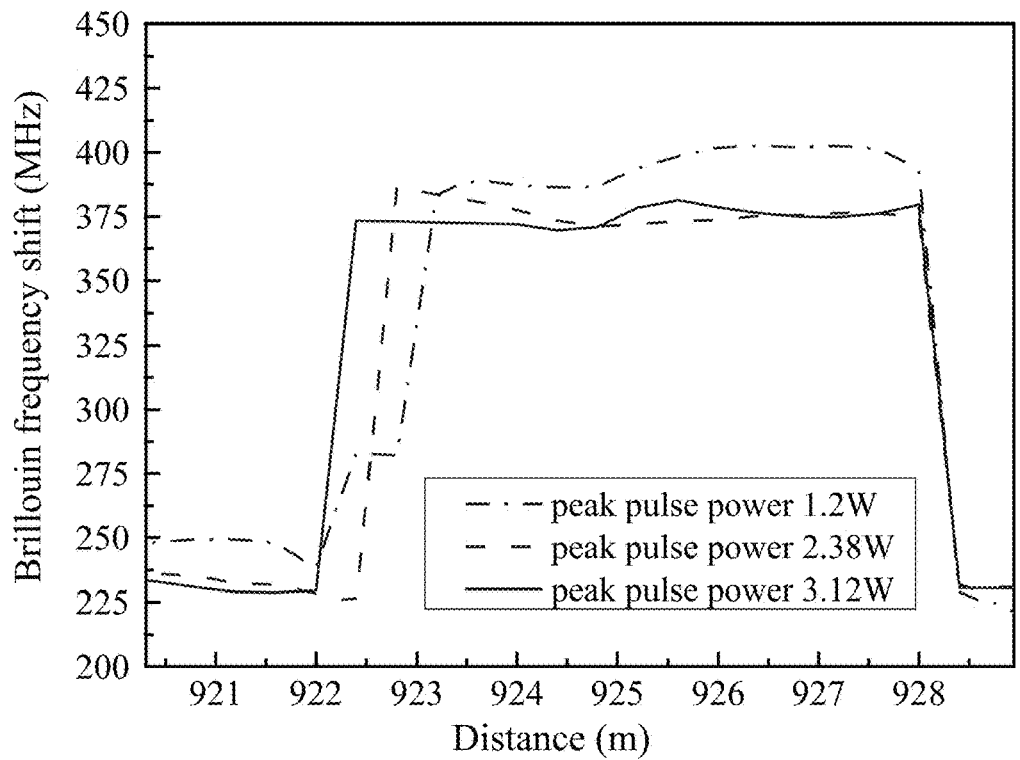
FIG. 7A is a plot of measured BFS profiles on fiber section S2.

The vibration of strain is added onto fiber section S2 34 with about 150 MHz (about 3000 pc) pre-strain. The BFS profiles of S2 are enlarged in FIG. 7A. The differences of BFS amplitudes between different input levels are caused by the strain vibration. In FIG. 7A, the rising edge of BFS for input peak pulse power of 3.12 W is from the position of 922 m to the position of 922.4 m. The rising edge of detected BFS profile for 2.38 W peak pulse power is one sampling point (0.4 m) later than that for 3.12 W. The rising edge for 1.2 W peak pulse power is even delayed more. This is the distance error in time domain due to the double-peak effect of the BFS spectra in frequency domain with large BFS change. With a worse SNR in the case of 1.2 W input, compared with that for the other two profiles, the distance error is more obvious due to the amplitude error by small SNR and the double-peak effect.

Figure 7B:
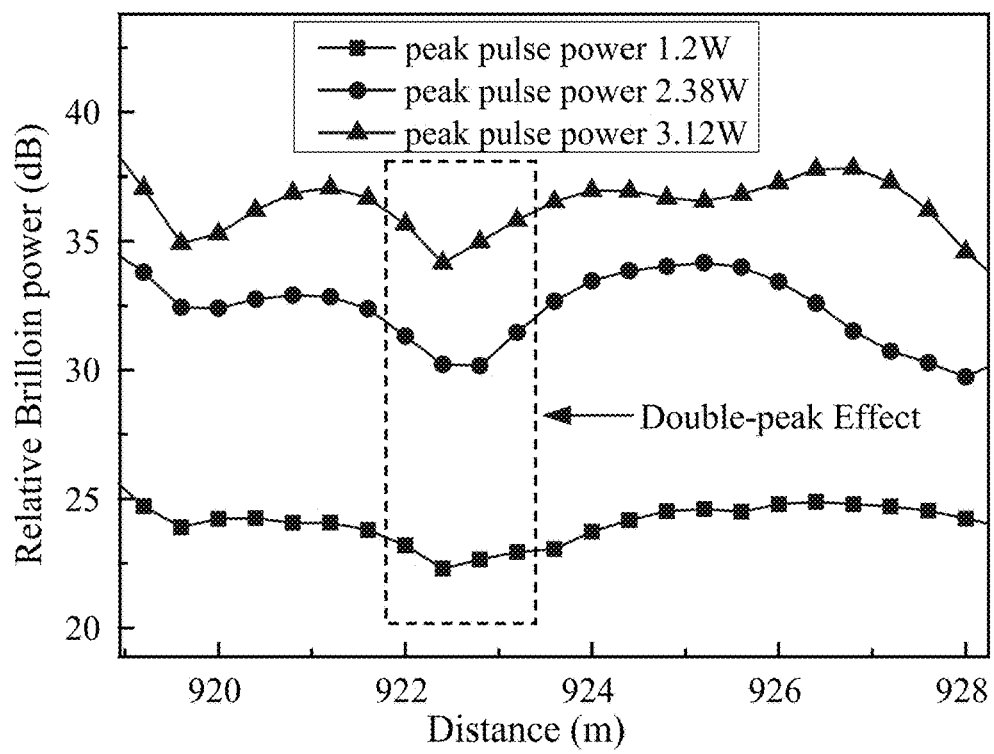
FIG. 7B is a plot of power profiles for BFS at different input peak pulse power.
Figure 7C:
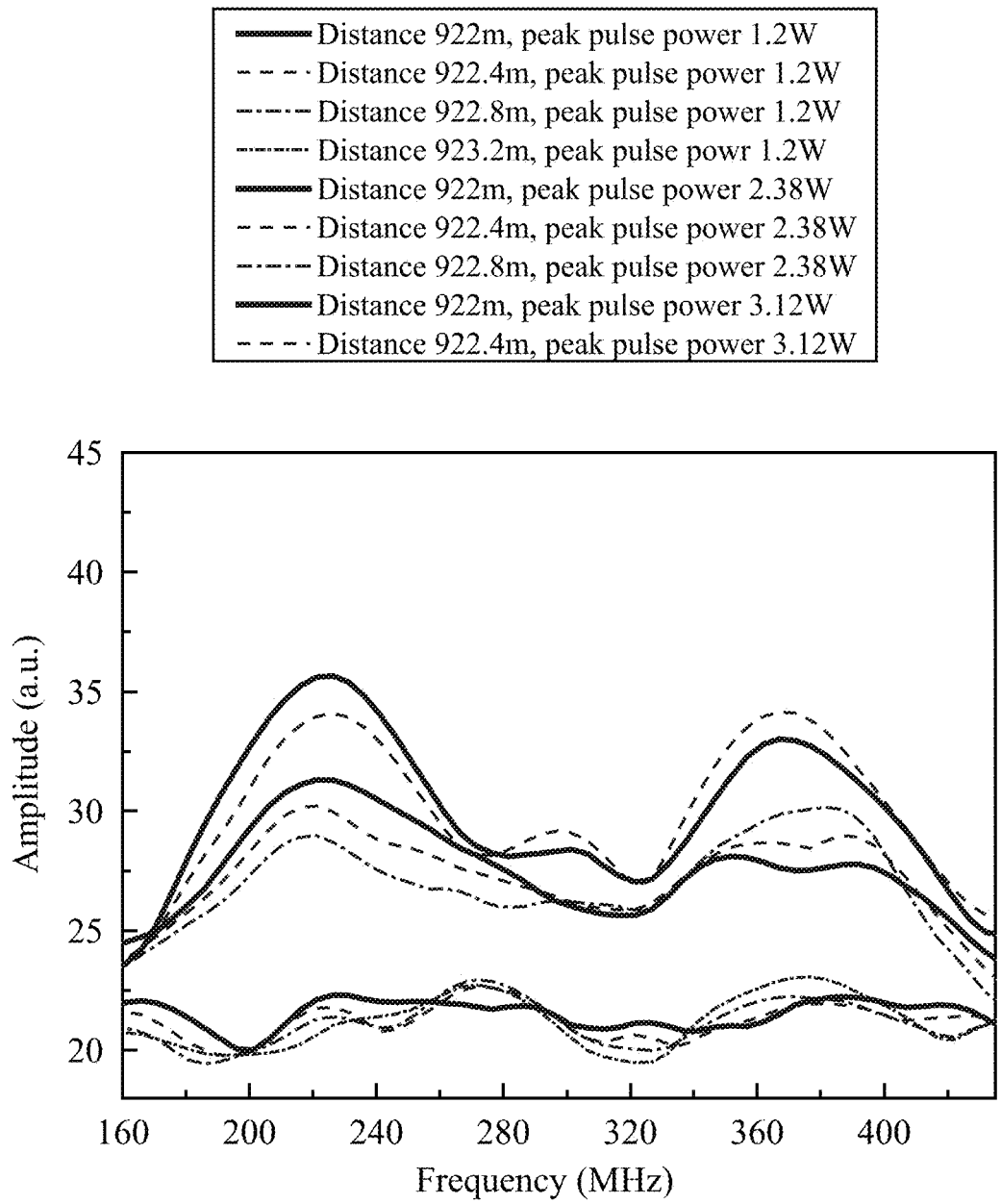
FIG. 7C is a plot of spectra at each sampling point of the rising edges in FIG. 7A.

The BFS power profiles corresponding to each BFS profile in FIG. 7A is given in FIG. 7B. The points in the rectangular box are the detected Brillouin power of the sampling points on the rising edges of the BFS profiles in FIG. 7A. At 3.12 W and 2.38 W peak pulse power, a local minimum point can be found respectively in the rectangle in FIG. 7B. At this transition point, the double peak effect splits the detected Brillouin power at one sampling point of the FUT 30 onto two BFS and hence the detected power of a single BFS drops. The spectra of the sampling points on the rising edges in FIG. 7A are drawn in FIG. 7C. It can be seen in FIG. 7C that the larger the peak pulse power, the better the SNR. The distance error effect can be smaller accordingly. The static performance of the BOTDR 10 was measured with the shaker off.

Figure 8A:
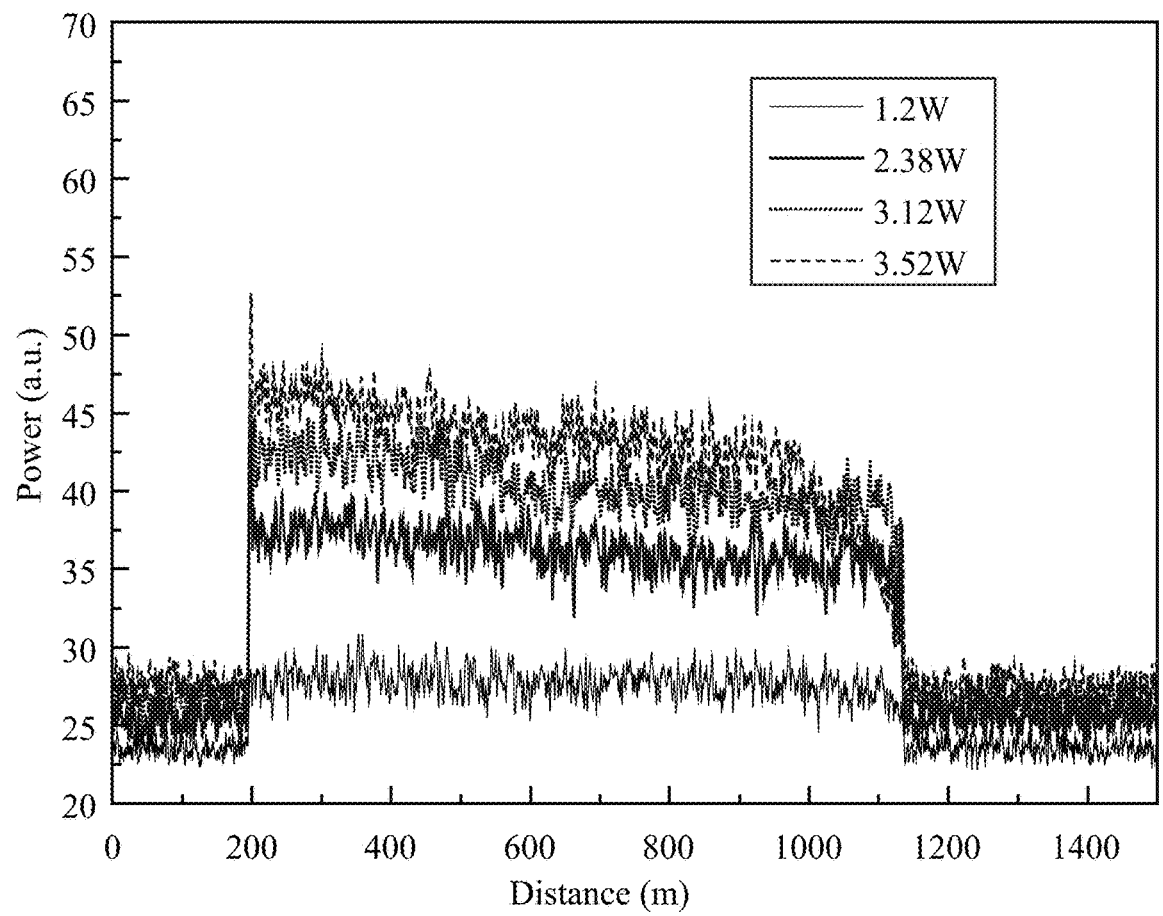
FIG. 8A is a plot of power traces of BFS at different input power.
Figure 8B:
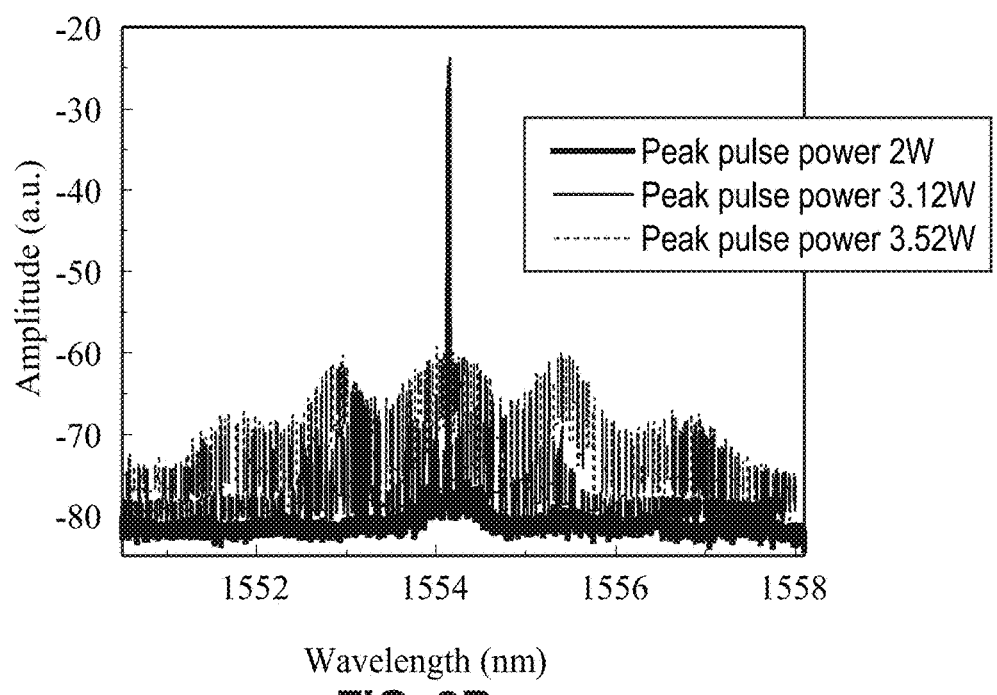
FIG. 8B is a plot of the measured optical spectra at different power levels.

With the same settings, the power traces of measured BFS along FUT 30 at different input power levels were obtained with 25 times of averaging and illustrated in FIG. 8A and FIG. 8B. At the input levels below 3.51 W, the power attenuation is very small and can be negligible at 1.2 W. At 3.51 W peak pulse power, the power depletion caused by MI can be clearly observed and cuts down the SNR at the far end of FUT 30. This power level can be seen as the MI threshold for this fiber length. FIG. 8B shows the measured optical spectra at the far end of FUT 30 at the peak pulse power of 2 W, 3.12 W and 3.52 W respectively. At 2 W peak pulse power, no MI is shown on the spectrum. At 3.12 W, a small MI can be seen located on both sides of the signal frequency. This MI spectrum grows significantly when peak pulse power increases to 3.52 W. By integration of the MI spectrum, the MI power is 10 dB lower than the signal power at 3.12 W peak pulse power, whereas the integrated MI power equals to the signal power at 3.52 W peak pulse power, which reaches the MI threshold.

Figure 9:
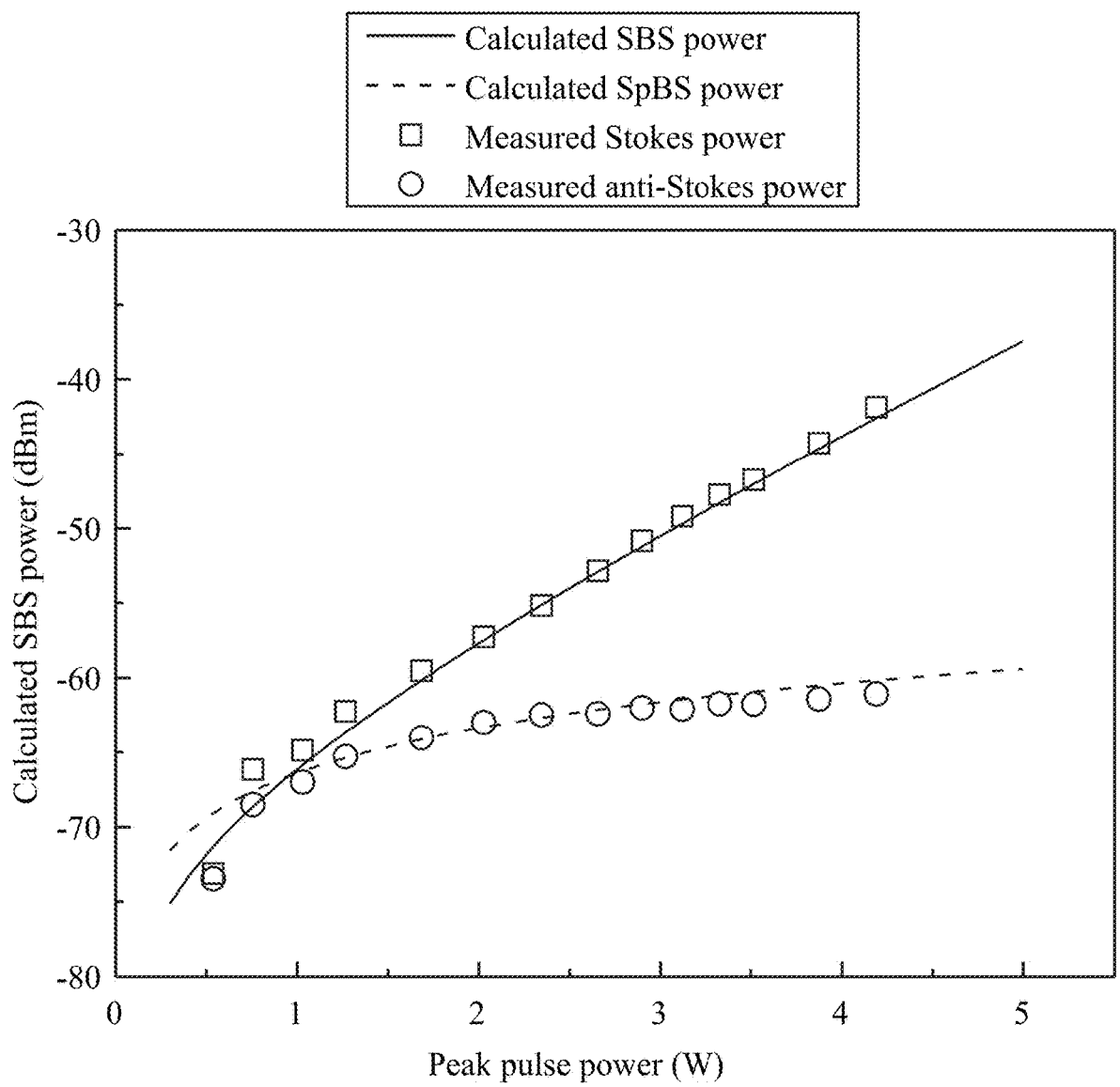
FIG. 9 is a plot of measured Stokes and anti-Stokes power of Brillouin scattering at different input peak pulse power and calculated SBS and SpBS power.

The measured Brillouin Stokes and anti-Stokes power, and the calculated SpBS power and SBS power by Eq. 9 and Eq. 11 are shown in FIG. 9. The measured Stokes power increases much faster than the anti-Stokes power and shows an exponential growth as the input peak pulse power rises. The measured Stokes power matches with the calculated SBS power. The measured anti-Stokes power shows a good fit with the calculated SpBS power. The anti-Stokes SBS propagates in positive direction along the fiber and attenuates exponentially. Hence the measured anti-Stokes can be seen as the SpBS. At around 1.1 W, the SBS and SpBS have the same power and SBS becomes dominant as the input peak pulse power continues rising. 1.2 W is used as the threshold of small gain SBS in this experiment, as demonstrated in FIG. 4. Apparently, even at the input peak pulse power of 4.19 W, the SBS power is still below the conventional SBS threshold which is mostly defined to be 100% or 1% of input power. But small gain SBS can be clearly seen under this condition from FIG. 9.

In conclusion, the input peak pulse power thresholds at short sensing distance were calculated. At sensing distance within 1 km, peak pulse power can be raised up compared with long sensing distance. Small gain SBS is used in BOTDR system 10 to enhance the SNR and to realize fast dynamic strain detection. A small gain SBS based BOTDR system of distributed dynamic strain vibration measurement has been established with the ability to measure as high as 1.25 kHz vibration. A vibration of 60 Hz on a fiber section of 5.6 meters has been successfully detected.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that that the present disclosure encompasses multiple embodiments which include, but are not limited to, the following:

1. A method for performing Brillouin optical time-domain reflectometry for distributed dynamic strain measurements of a structure, the method comprising: applying a stimulated Brillouin scattered (SBS) signal to the structure; simultaneously detecting the SBS signal from the structure and a continuous-wave reference signal to produce an output signal; processing the output signal; and measuring a distribution of the Brillouin frequency shifts (BFS) along the structure to calculate one or more of an applied strain or temperature change on the structure.

2. The method of any of the preceding embodiments, wherein processing the output signal comprises rebuilding of the Brillouin frequency shift (BFS) with short-time Fourier transform (STFT).

3. The method of any of the preceding embodiments, wherein the SBS signal comprises a stimulated Brillouin counter-propagating pulse signal.

4. The method of any of the preceding embodiments, wherein the SBS signal comprises a small-gain SBS signal.

5. The method of any of the preceding embodiments, wherein the stimulated Brillouin scattered (SBS) signal and reference signal are split from a continuous wave light.

6. The method of any of the preceding embodiments, wherein the reference signal comprises an optical local oscillator (OLO).

7. The method of any of the preceding embodiments, wherein the OLO reference signal and the Brillouin scattered (SBS) signal are mixed on a photodetector to produce the output signal.

8. The method of any of the preceding embodiments, wherein the output signal is downconverted, amplified, filtered and digitized prior to processing.

9. A Brillouin optical time-domain reflectometry (BOTDR) based distributed dynamic strain sensor, comprising: (a) a light source and signal generator configured for applying a stimulated Brillouin scattered (SBS) signal to a structure; (b) a detector configured for simultaneously detecting the SBS signal from the structure and a continuous-wave reference signal to produce an output signal; (c) a processor for processing the output signal; and (d) a non-transitory memory storing instructions executable by the processor; (e) wherein said instructions, when executed by the processor, perform steps comprising: (i) measuring a distribution of the Brillouin frequency shifts (BFS) along the structure; (ii) calculating one or more of an applied strain or temperature change on the structure from the measured BFS distribution.

10. The sensor of any of the preceding embodiments, wherein calculating one or more of an applied strain or temperature change on the structure rebuilding of the Brillouin frequency shift (BFS) with short-time Fourier transform (STFT).

11. The sensor of any of the preceding embodiments, wherein the SBS signal comprises a stimulated Brillouin counter-propagating pulse signal.

12. The sensor of any of the preceding embodiments, wherein the SBS signal comprises a small-gain SBS signal.

13. The sensor of any of the preceding embodiments, further comprising: a first optical coupler configured to split a continuous wave light into the stimulated Brillouin scattered (SBS) signal and reference signal.

14. The sensor of any of the preceding embodiments, wherein the reference signal comprises an optical local oscillator (OLO) comprising a polarization scrambler configured to provide random polarization to the reference signal.

15. The sensor of any of the preceding embodiments, wherein the detector comprises a photodetector, and wherein the reference signal and the Brillouin scattered (SBS) signal are mixed on a photodetector via a second optical coupler to produce the output signal.

16. The sensor of any of the preceding embodiments wherein the photodetector further comprises an oscillator to downconvert the output signal, an amplifier, and a band-pass filter to produce the output signal.

17. The sensor of claim 16, further comprising a digitizer to digitize the output signal prior to processing by the processor.

18. The sensor of any of the preceding embodiments, wherein light split from the first optical coupler comprises a first branch comprising an electro-optic modulator for modulating light split in the first branch according to a signal from the signal generator using a specified pulse repetition rate.

19. The sensor of any of the preceding embodiments, wherein the modulated light is amplified by a tunable erbium-doped fiber amplifier (EDFA) and filtered by a band pass filter (BPF) and injected into a circulator prior to being applied to the structure.

20. The sensor of any of the preceding embodiments, wherein light source comprises a narrow-line width external cavity laser.

21. An apparatus for performing Brillouin optical time-domain reflectometry for distributed dynamic strain measurements of a structure, the apparatus comprising: (a) a light source; (b) a signal generator and modulator configured for manipulating light from the light source to apply a stimulated small-gain Brillouin scattered (SBS) signal to the structure; (c) a detector configured for simultaneously detecting the SBS signal from the structure and a continuous-wave reference signal to produce an output signal; (d) a processor for processing the output signal; and (e) a non-transitory memory storing instructions executable by the processor; (f) wherein said instructions, when executed by the processor, perform steps comprising: (i) measuring a distribution of the Brillouin frequency shifts (BFS) along the structure; (ii) calculating one or more of an applied strain or temperature change on the structure from the measured BFS distribution.

22. The apparatus of any of the preceding embodiments, wherein calculating one or more of an applied strain or temperature change on the structure rebuilding of the Brillouin frequency shift (BFS) with short-time Fourier transform (STFT).

23. The apparatus of any of the preceding embodiments, further comprising: a first optical coupler configured to split a continuous wave light into the stimulated Brillouin scattered (SBS) signal and reference signal.

24. The apparatus of any of the preceding embodiments, wherein the reference signal comprises an optical local oscillator (OLO) comprising a polarization scrambler configured to provide random polarization to the reference signal.

25. The apparatus of any of the preceding embodiments, wherein the detector comprises a photodetector, and wherein the reference signal and the Brillouin scattered (SBS) signal are mixed on a photodetector via a second optical coupler to produce the output signal.

26. The apparatus of any of the preceding embodiments, wherein light split from the first optical coupler comprises a first branch comprising an electro-optic modulator for modulating light split in the first branch according to a signal from the signal generator using a specified pulse repetition rate.

27. A method for performing distributed dynamic strain measurements of a structure, the method comprising: (a) providing a Brillouin optical time-domain reflectometer (BOTDR) system with a test optical fiber; (b) applying stimulated Brillouin counter propagating pulse and continuous wave signals in the optical fiber; (c) detecting reference light and Brillouin scattered light with a photodetector to produce an output signal; (d) processing the output signal;

and (e) measuring the distribution of the Brillouin frequency shifts (BFS) along the fiber to derive the applied strain amplitude or temperature change.

28. The method of any preceding embodiment, further comprising:

processing the output signal with short-time Fourier transform (STFT) algorithm.

29. A Brillouin optical time-domain reflectometry (BOTDR) based distributed dynamic strain sensor, comprising: (a) a light source module configured to produce stimulated Brillouin counter propagating pulse and continuous wave signals in an optical test fiber; (b) a photodetection module capable of detecting reference light and Brillouin scattered light with a photodetector to produce an output signal; (c) a signal processing module configured to process and analyze the output signal.

30. The apparatus of any preceding embodiment, wherein the light source module comprises: (a) a narrow-linewidth external cavity laser providing continuous-wave (CW) light at 1550 nm; (b) a 50/50 coupler configured to split light from the laser into two branches; (c) an electro-optic modulator (EOM) with a signal generator for modulating one branch of the split light beam; (d) a tunable erbium-doped fiber amplifier (EDFA) amplifying the output of the EOM; (e) a band pass filter (BPF); (f) a circulator receiving a filtered beam from the band pass filter (BPF); (g) a polarization scrambler (PS) for modulating reference light of a second branch of the split light beam; and (h) a second 50/50 coupler.

31. The apparatus of any preceding embodiment, wherein the photodetection module comprises (a) a photodetector producing an output signal; (b) a local oscillator for downconverting the output signal; (c) an amplifier; (d) a band pass filter; (e) a digitizer; and (f) a signal processing computer.

32. The apparatus of any preceding embodiment, wherein the signal processing computer processes the output signal with short-time Fourier transform (STFT) algorithm.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A method for performing Brillouin optical time-domain reflectometry for distributed dynamic strain measurements of a structure, the method comprising:

splitting a continuous-wave laser output into a first and second branch;

modulating the first signal branch using electro optic modulation controlled by received pulses into a stimulated Brillouin scattered (SBS) signal;

wherein the continuous-wave laser output from said second branch comprises a continuous wave reference signal;

applying the stimulated Brillouin scattered (SBS) signal to an optical fiber attached or embedded in a structure;

simultaneously detecting the SBS signal from the structure and coupling this with the continuous-wave reference signal to a photodetector to produce an output signal;

processing the output signal using Brillouin optical time-domain reflectometry (BOTDR) comprising a small gain SBS based short-time Fourier transform (STFT) configured to provide a desired spatial sampling resolution along said optical fiber; and measuring a distribution of the Brillouin frequency shifts (BFS) along the structure to calculate one or more of an applied strain or temperature change on the structure.

2. The method of claim 1, wherein processing the output signal comprises rebuilding of the Brillouin frequency shift (BFS) with short-time Fourier transform (STFT).

3. The method of claim 1, wherein the SBS signal comprises a stimulated Brillouin counter-propagating pulse signal.

4. The method of claim 1, wherein the SBS signal comprises a small-gain SBS signal, and is not relying on spontaneous Brillouin scattering (SpBS).

5. The method of claim 1, wherein the stimulated Brillouin scattered (SBS) signal and reference signal are split from a continuous wave light by a coupler into optical signals along said first branch and said second branch.

6. The method of claim 1, wherein the reference signal comprises an optical local oscillator (OLO).

7. The method of claim 6, wherein the OLO reference signal and the Brillouin scattered (SBS) signal are mixed on a photodetector to produce the output signal.

8. The method of claim 7, wherein the output signal is downconverted, amplified, filtered and digitized prior to processing.

9. A Brillouin optical time-domain reflectometry (BOTDR) based distributed dynamic strain sensor, comprising:

(a) a continuous-wave light source configured for outputting an optical signal to a first and second branch, and a signal generator coupled to an electro optic modulator (EOM) configured for modulating the optical signal in said first branch into a stimulated Brillouin scattered (SBS) signal, and wherein the optical signal in said second branch comprises a continuous wave reference signal;

(b) applying the stimulated Brillouin scattered (SBS) signal to an optical fiber attached or embedded in a structure;

(c) a detector configured for simultaneously detecting the SBS signal from the structure and coupling this with the continuous-wave reference signal to a photodetector to produce an output signal;

(d) a processor for processing the output signal; and (e) a non-transitory memory storing instructions executable by the processor;

(f) wherein said instructions, when executed by the processor, perform steps comprising:

(i) measuring a distribution of the Brillouin frequency shifts (BFS) along the structure by using Brillouin optical time-domain reflectometry (BOTDR) comprising a small gain SBS based short-time Fourier transform (STFT) configured to provide a desired spatial sampling resolution along said optical fiber;

(ii) calculating one or more of an applied strain or temperature change on the structure from the measured BFS distribution.

10. The sensor of claim 9, wherein calculating one or more of an applied strain or temperature change on the structure is performed in response to a rebuilding of the Brillouin frequency shift (BFS) with short-time Fourier transform (STFT).

11. The sensor of claim 9, wherein the SBS signal comprises a stimulated Brillouin counter-propagating pulse signal.

12. The sensor of claim 9, wherein the SBS signal comprises a small-gain SBS signal, and is not relying on spontaneous Brillouin scattering (SpBS).

13. The sensor of claim 9, further comprising:
a first optical coupler configured to split said continuous wave light into optical signals on said first branch and said second branch.

14. The sensor of claim 13, wherein the reference signal comprises an optical local oscillator (OLO) comprising a polarization scrambler configured to provide random polarization to the reference signal.

15. The sensor of claim 13, wherein the detector comprises a photodetector, and wherein the continuous wave reference signal and the Brillouin scattered (SBS) signal are mixed on a photodetector via a second optical coupler to produce the output signal.

16. The sensor of claim 15, wherein the photodetector further comprises an oscillator to downconvert the output signal, an amplifier, and a band-pass filter to produce the output signal.

17. The sensor of claim 16, further comprising a digitizer to digitize the output signal prior to processing by the processor.

18. The sensor of claim 13, wherein the signal generator is configured for using a specified pulse repetition rate for controlling said electro optical modulator (EOM).

19. The sensor of claim 18, further comprising a tunable erbium-doped fiber amplifier (EDFA) for amplifying the optical signal along said first pass which is then filtered by a band pass filter (BPF) and injected into a circulator prior to being applied to the optical fiber attached or embedded in the structure.

20. The sensor of claim 9, wherein said continuous-wave light source comprises a narrow-line width external cavity laser.

21. An apparatus for performing Brillouin optical time-domain reflectometry for distributed dynamic strain measurements of a structure, the apparatus comprising:

(a) a continuous-wave light source configured for outputting an optical signal to a first branch and to a second branch, wherein the optical signals in said second branch comprises a continuous-wave reference signal;

(b) a signal generator and modulator configured for manipulating the optical signal in said first branch into a stimulated small-gain Brillouin scattered (SBS) signal directed into an optical fiber attached or embedded in a structure;

(c) a detector configured for simultaneously detecting the SBS signal from the structure and the continuous-wave reference signal to produce an electrical output signal;

(d) a processor for processing the electrical output signal; and (e) a non-transitory memory storing instructions executable by the processor;

(f) wherein said instructions, when executed by the processor, perform steps comprising:

(i) measuring a distribution of the Brillouin frequency shifts (BFS) along the structure by using Brillouin optical time-domain reflectometry (BOTDR) comprising a small gain SBS based short-time Fourier transform (STFT) configured to provide a desired spatial sampling resolution along said optical fiber;

(ii) calculating one or more of an applied strain or temperature change on the structure from the measured BFS distribution, by rebuilding of the Brillouin frequency shift (BFS) with short-time Fourier transform (STFT).

22. The apparatus of claim 21, wherein calculating one or more of an applied strain or temperature change on the structure comprises rebuilding of the Brillouin frequency shift (BFS) with short-time Fourier transform (STFT).

23. The apparatus of claim 21, further comprising:
a first optical coupler configured to split said continuous wave light into optical signals on said first branch and said second branch.

24. The apparatus of claim 23, wherein the continuous-wave reference signal comprises an optical local oscillator (OLO) comprising a polarization scrambler configured to provide random polarization to the reference signal.

25. The apparatus of claim 23, wherein the detector comprises a photodetector, and wherein the continuous wave reference signal and the Brillouin scattered (SBS) signal are mixed on a photodetector via a second optical coupler to produce the output signal.

26. The apparatus of claim 23, wherein the signal generator is configured for using a specified pulse repetition rate for controlling said electro optical modulator (EOM).

* * * * *